"""" US007354518B2

United States Patent
Clukies

(10) Patent No.: US 7,354,518 B2
(45) Date of Patent: Apr. 8, 2008

(54) WATER POLLUTION PREVENTION AND REMEDIATION METHOD

(75) Inventor: Paul Clukies, Highlands Ranch, CO (US)

(73) Assignee: Paul Arthur Cluckies, Highlands Ranch, CO (US)

( * ) Notice: Subject to any disclaimer, the term of this patent is extended or adjusted under 35 U.S.C. 154(b) by 0 days.

(21) Appl. No.: 11/549,907

(22) Filed: Oct. 16, 2006

(65) Prior Publication Data
US 2007/0068874 A1 Mar. 29, 2007

Related U.S. Application Data

(62) Division of application No. 10/342,595, filed on Jan. 15, 2003, now Pat. No. 7,138,055.

(51) Int. Cl.
*C02F 1/40* (2006.01)
(52) U.S. Cl. .................................. 210/691; 210/693
(58) Field of Classification Search ............... 210/691, 210/692, 693, 924
See application file for complete search history.

(56) References Cited

U.S. PATENT DOCUMENTS

| 4,031,839 | A | * | 6/1977 | Pedone | 114/382 |
| 4,861,475 | A | * | 8/1989 | Peterson | 210/242.4 |
| 5,863,440 | A | * | 1/1999 | Rink et al. | 210/693 |
| 6,312,596 | B1 | * | 11/2001 | Kunzelman | 210/242.3 |

* cited by examiner

*Primary Examiner*—Matthew O. Savage
(74) *Attorney, Agent, or Firm*—Marsh Fischmann & Breyfogle LLP

(57) ABSTRACT

A fluid pollution prevention system for preventing the discharge of hazardous waste from a bilge of a marine vessel, and removal of the same from the bilge. The system includes an absorber for absorbing hazardous waste from a fluid in the bilge. The system further includes a locator for locating the absorber in a predetermined orientation relative to a bilge pump to prevent the discharge of hazardous waste from the bilge. In one embodiment of the invention, the locator is an upstanding member in relation to the fluid in the bilge and includes at least one locator channel defined along at least a portion of the locator for slidable receipt of the absorber. According to this characterization, the absorber is movable along the locator channel as a function of the bilge fluid level to absorb hazardous waste from the fluid and isolate an inlet of the bilge pump from receipt of the same.

18 Claims, 4 Drawing Sheets

WATER POLLUTION PREVENTION AND REMEDIATION METHOD

CROSS-REFERENCE TO RELATED APPLICATIONS

This application is a divisional of U.S. patent application Ser. No. 10/342,595 filed Jan. 15, 2003; now U.S. Pat. No. 7,138,055.

FIELD OF THE INVENTION

The invention is related to the field of water pollution prevention, and in particular, to preventing the discharge of hazardous waste, and recovery of the same, from a marine vessel.

BACKGROUND OF THE INVENTION

By design, substantially all potential fluid containment areas of a marine vessel, e.g., boat, jet ski, offshore drilling platform, etc. drain toward a common collecting area known as a bilge. The bilge is typically located in a lower or bottom portion of a vessel and includes a pump. The pump is referred to in the art as a bilge pump, and upon accumulation of a predetermined amount of fluid in the bilge, the bilge pump is designed to pump the collected fluid overboard of the vessel.

An automatic switch activated by a float ("float switch"), controls operation of the bilge pump. The float switch functions to start and stop the pump according to the level of fluid contained in the bilge, as indicated by the float. The switch is electrically connected to the bilge pump such that as fluid accumulates in the bilge, the float floats upward with the fluid level until the switch is triggered to initiate operation of the pump, and begin pumping the fluid overboard. Similarly, as the fluid is pumped overboard and the fluid level in the bilge falls, the float floats down with the fluid level, where it again triggers the switch to terminate operation of the pump.

Due to the location of the bilge in the bottom of a vessel, hazardous waste, such as oil, gasoline, diesel fuel, grease, fuel, transmission fluid etc., are also subject to collection in the bilge along with non-hazardous fluids such as rainwater, air conditioner condensate, and water brought onto the vessel due to swimming and/or other activities. These hazardous waste fluids, if not removed prior to operation of the bilge pump, are discharged overboard with the other fluids, thereby polluting the surrounding waterway. Additionally, under current laws, the discharge of such hazardous waste fluids into a waterway is a source of liability for owners and operators of marine vessels. Therefore, a need exists in the art for preventing the discharge, as well as removal of, hazardous fluids from marine vessels.

SUMMARY OF THE INVENTION

In view of the foregoing, a primary object of the present invention is to provide an improved method and apparatus for preventing the discharge of hazardous fluids into a waterway. A related primary object of the present invention is to provide an improved method and apparatus for preventing or reducing the discharge of such hazardous fluids from their source or point of origination, namely a bilge area of a marine vessel. Another object of the present invention is to provide a method and apparatus for improved removal of hazardous fluids from a bilge area of a marine vessel. A related object of the present invention is to minimize or eliminate the introduction of hazardous fluids to a bilge pump in a marine vessel. Another object of the present invention is to provide an apparatus that improves remediation of hazardous fluids in the bilge area of a marine vessel.

In the context of the present invention, the term "marine vessel" includes any structure having a collection area, e.g., a bilge, for disposal of fluids into a waterway, with some examples including without limitation, boats, ships, jet skis, offshore drilling platforms and the like, etc. Also, in the context of the present invention, hazardous waste fluids are referred to herein as petrochemicals and include at least hydrocarbon compounds such as crude oil, diesel, gasoline, transmission oil, gear oil and the like. Furthermore, it will be appreciated that due to the density difference and buoyancy forces between petrochemicals and water, petrochemicals float on the surface of water and are most notably apparent by the appearance of a shiny film.

One or more of the above objectives and additional advantages may be realized by a first aspect of the present invention, which provides an absorber for removing petrochemicals from a fluid in a bilge area of a marine vessel. The absorber includes a frame having a geometric shape that defines an interior space or area within the absorber. The absorber further includes a petrochemical absorbent material configured in the geometric shape of the frame and connectable to the frame to form the absorber. Preferably, such material is hydrophobic, such that it is impervious to water and substantially only absorbs petrochemicals or other potentially hazardous fluids.

Various refinements exist of the features noted in relation to the subject first aspect of the present invention. Further features may also be incorporated in the subject first aspect as well. These refinements and additional features may exist individually or in any combination. For instance, according to one embodiment of the absorber, the interior area may be sized and shaped for positioning around a bilge pump of a marine vessel. In this regard, the absorber may operate to absorb petrochemicals from the fluid in the bilge as well as to isolate an inlet(s) of the bilge pump from receipt of petrochemicals. In the latter case, the absorber may be floatable on the fluid such that as the fluid is pumped from the bilge, the absorber lowers with the fluid to circumscribe the bilge pump, and specifically, the bilge pump inlet(s). In this case, the exact geometric shape of the frame is only limited by the requirement of defining an interior space/area sized and shaped to accommodate a bilge pump. Thus, the frame may be a rectangular, square, circular, ovular etc. shape as a matter of design choice. Additionally, the interior space/area defined by the frame may be fully or only partially enclosed.

In one arrangement, the absorber may include a cover material connected around the frame and absorbent material. The cover material may be a petrochemical absorbent material or may be a material that allows fluid and petrochemicals to pass through to the enclosed absorbent material. In another arrangement, the absorber may include an indicator to provide information to a user regarding the level of saturation of the absorbent material and thus the need for replacement of the same.

One or more of the above objectives and additional advantages may also be realized by a second aspect of the present invention, which provides an apparatus for positioning a petrochemical absorber in a bilge area of a marine vessel. The apparatus includes a locator mountable in the bilge area in vertical relation to a fluid therein and a channel defined along at least a portion of the locator for slidable receipt of the absorber. The absorber is movable along the channel as a function of a fluid level in the bilge area.

Various refinements exist of the features noted in relation to the subject second aspect of the present invention. Further features may also be incorporated in the subject second aspect as well. These refinements and additional features may exist individually or in any combination. For instance, the locator may be positioned in the bilge area in a generally upstanding relation to the fluid therein to define a predetermined path of travel for the absorber. In another instance, the locator may also laterally restrain the absorber during movement through the absorber's predetermined path of travel as determined by the locator.

According to one embodiment, the locator includes a single housing defining a channel from a lower portion connected to a base member to an upper portion proximate a maximum fluid level of a bilge area. According to another embodiment, the locator may include a pair of substantially parallel housings defining a first and second channel respectively from a lower portion connected to a base to an upper portion proximate a maximum fluid level of a bilge area. In the first embodiment, the locator may be configured for use with an enclosed or substantially enclosed absorber. In the latter embodiment, the locator may be configured for use with a semi-enclosed absorber such that a first end is slidably received in one of the channels and a second end is slidably received in the other one of the channels. According to this characterization, the locator may further include a sealing wall disposed between the two housings. The sealing wall may further include a passage for a discharge outlet conduit of a bilge pump. In this manner, the absorber is movable along the locator between lower and upper portions as a function of the fluid level.

In either of the above embodiments, the locator is preferably positioned proximate a bilge pump to absorb petrochemicals from the surrounding bilge fluid and substantially prevent entry of petrochemicals into an inlet(s) of the bilge pump as the absorber is moved along the locator, as a function of the bilge fluid level.

One or more of the above objectives and additional advantages may also be realized by a third aspect of the present invention, which provides an apparatus for removal of petrochemicals from fluid in a bilge area of a marine vessel. The apparatus includes an absorber for absorbing petrochemicals and a locator for locating the absorber in the bilge area of a marine vessel. The locator may further include the channel defined along at least a portion of the locator for slidable receipt of the absorber, wherein the absorber is movable along the channel as a function of the fluid level in the bilge area.

Various refinements exist of the features noted in relation to the subject third aspect of the present invention. Further features may also be incorporated in the subject third aspect as well. These refinements and additional features may exist individually or in any combination. For instance, the locator and absorber may be various combinations of the above set forth embodiments of locators and absorbers according to the present invention.

One or more of the above objectives and additional advantages may also be realized by a fourth aspect of the present invention, which provides a method of removing petrochemicals from a fluid in a bilge of a marine vessel. The method comprises positioning a locator in the bilge of the marine vessel in an upstanding relation to a bilge fluid level and moving a petrochemical absorber along the locator using the fluid level. The method further includes absorbing petrochemicals from the fluid in the bilge area using the absorber.

Various refinements exist of the features noted in relation to the subject fourth aspect of the present invention. Further features may also be incorporated in the subject fourth aspect as well. These refinements and additional features may exist individually or in any combination. For instance, the locator may be positioned proximate a bilge pump and the positioning step may include locating the bilge pump in an interior area of the absorber using the locator. Similarly, the absorbing step may include contacting petrochemicals with the absorber and absorbing the petrochemicals with a wicking action as the absorber is moved along locator.

One or more of the above objectives and additional advantages may also be realized by a fifth aspect of the present invention, which provides a method of removing petrochemicals from a fluid in a bilge of a marine vessel. The method comprises locating an absorber in a predetermined lateral position within the bilge, moving the absorber up and down within the bilge as a function of a fluid level, maintaining the lateral position of the absorber as the absorber moves up and down and absorbing petrochemicals from the fluid.

Various refinements exist of the features noted in relation to the subject fifth aspect of the present invention. Further features may also be incorporated in the subject fifth aspect of the present invention as well. These refinements and additional features may exist individually or in any combination. Furthermore, additional aspects, advantages and applications of the present invention will be apparent to those skilled in the art upon consideration of the following.

DETAILED DESCRIPTION

Reference will now be made to the accompanying drawings, which at least assist in illustrating the various pertinent features of the present invention. In this regard, the following description is presented for purposes of illustration and description and is not intended to limit the invention to the form disclosed herein. Consequently, variations and modifications commensurate with the following teachings, and skill and knowledge of the relevant art, are within the scope of the present invention. The embodiments described herein are further intended to explain the best modes known of practicing the invention and to enable others skilled in the art to utilize the invention in such, or other embodiments and with various modifications required by the particular application(s) or use(s) of the present invention.

Figure 1:
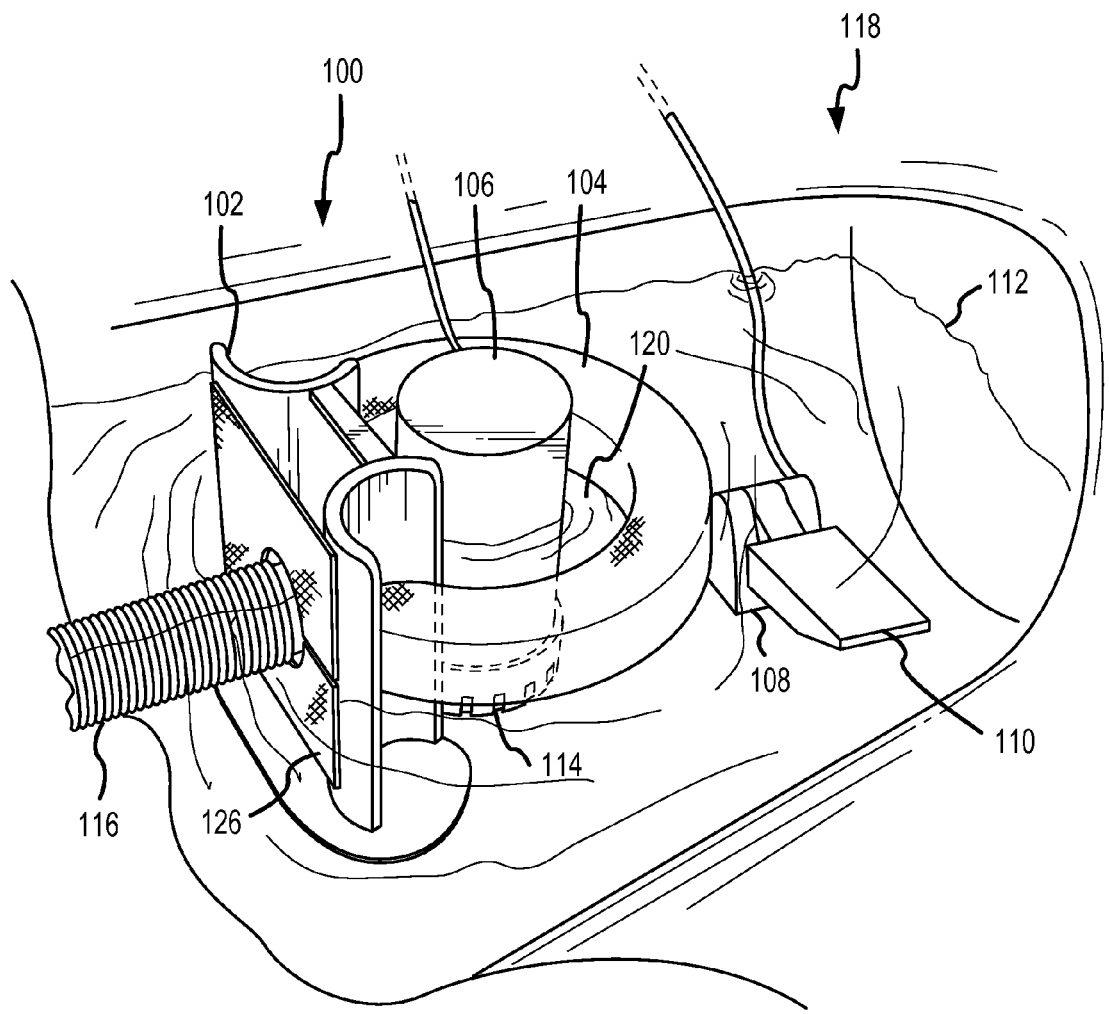
FIG. 1 illustrates a water pollution prevention apparatus installed in a bilge of a marine vessel.

As shown in FIG. 1, a water pollution prevention apparatus 100 includes a locator 102 and an absorber 104. The water pollution prevention apparatus 100 is designed for mounting in a bilge 118 of a marine vessel. While the apparatus 100 may be mounted at various locations within the bilge 118, the water pollution prevention apparatus 100 is most advantageous when positioned proximate a bilge pump 106, such that an interior space 120, of the absorber 104 is positionable around the pump 106. Alternatively, however, it will be appreciated from the following description that other mounting locations are possible and anticipated to achieve the objects and advantages of the present invention, namely preventing the discharge of petrochemicals from marine vessels and removal of the same from bilge areas, e.g., bilge 118.

By way of background, the bilge pump 106 may be any one of numerous types of bilge pump systems utilized in marine vessels. For purposes of illustration, however, the bilge pump 106 is shown on FIG. 1 to include components that are typically included on bilge pump systems. In this regard, the bilge pump 106 includes fluid inlets 114 disposed around its base, as well as a fluid outlet conduit 116, connected to a location external to the bilge 118. During operation of the pump 106, the fluid 112 is drawn into the fluid inlets 114 from the bilge 118 and discharged overboard of the vessel through the outlet conduit 116. It will be appreciated that in a typical bilge pump system, such as bilge pump system 106, it is desirable to locate the fluid inlets 114 at the lowest practical point within the bilge 118 to facilitate removal of a maximum amount of fluid 112 during operation of the pump 106.

An automatic float switch 108, that includes a float 110, controls operation of the pump 106. The float switch 108 functions to start and stop the pump 106 according to a level of fluid 112 contained within the bilge 118, as indicated by the float 110. The float switch 108 is electrically connected to the pump 106 such that as the fluid 112 accumulates in the bilge 118, the float 110 floats upward with the fluid 112 until the float switch 108 is triggered to initiate operation of the pump 106 and begin pumping the fluid 112 overboard; most commonly through a discharge tube or hose, e.g., conduit 116, between the bilge pump discharge port and an exit orifice located external to the vessel. Similarly, as the fluid 112 is pumped overboard and the level of fluid 112 falls, the float 110 floats down with the level of fluid 112 and again triggers the float switch 108 to terminate operation of the pump 106.

The locator 102, of the water pollution prevention apparatus 100, operates to position the absorber 104 within the bilge 118 as the level of fluid 112 moves up and down between pumping cycles. Specifically, as the fluid 112 moves up within the bilge 118 the absorber 104 is floated up along the locator 102 with the fluid 112. Likewise as the level of fluid 112 drops, the absorber 104 moves down the locator 102 with the level of fluid 112. Thus, the locator 102 defines a predetermined path of travel for the absorber 104 as a function of the level of fluid 112 in the bilge 118.

The locator 102 also maintains lateral positioning of the absorber 104 within the bilge 118. Preferably, such lateral positioning locates the absorber 104 around the bilge pump 106, as the level of fluid 112 moves up and down between pumping cycles. In this regard, the absorber 104 includes the interior area 120, which is substantially free from petrochemicals. Further, the absorber 104 preferably comprises a material that absorbs petrochemicals from the fluid 112, such that petrochemicals are unable to pass under or through the absorber 104. This in turn maintains the area 120 substantially free from petrochemicals; thereby isolating the inlets 114 of the bilge pump 106 from receipt of petrochemicals. According to this characterization, as the level of fluid 112 drops in the bilge 118, the absorber 104 and interior area 120, are moved down along the locator 102 to a position where the absorber 104 circumscribes the fluid inlets 114 of the pump 106. This in turn isolates the inlets 114 during operation of the pump 106 from receipt of petrochemicals, thereby preventing their discharge into the adjacent waterway(s).

Furthermore, where petrochemicals are introduced into the area 120, such as by splashing over the top of the absorber 104, the petrochemicals should be absorbed into the absorber 104 prior to reaching the inlets 114. This follows from the inherent operational characteristics of the bilge pump 106, in combination with the design and operational characteristics of the present water pollution prevention apparatus 100. For instance, since the pump 106 only operates when the fluid 112 reaches a predetermined height or level, if splash-over occurs with less than the predetermined fluid level, the pump 106 is non-operational and the absorber 104 has time to absorb any splashed over petrochemicals in the area 120 prior to operation of the pump 106. If on the other hand, the fluid level is at or close to the predetermined level, e.g., where the pump 106 is about to be operated, the absorber 104 should still absorb substantially all of the petrochemicals prior to the fluid level dropping to a point where petrochemicals on the surface can be drawn into the inlets 114. In this regard, it is anticipated that due to the relatively small size of the area 120, relative to the bilge 118, substantially all, if not all, of any petrochemicals introduced in the area 120 will be quickly absorbed by the absorber 104.

It should also be noted, that the absorber 104 may be constructed in a variety of predetermined thicknesses, as a function of the vessel for which it is to be used. For instance, a thicker absorber 104 increases the availability of absorbent material for absorbing petrochemicals from the fluid 112. Furthermore, a thicker absorber 104 minimizes the amount of splash-over of fluid 112 into the area 120, which as noted, may briefly introduce petrochemicals 300 into the area 120. Thus, by utilizing a thicker absorber 104 in vessels that are more susceptible to turbulent conditions, the introduction of petrochemicals via splash-over into the area 120 may be further minimized.

Figure 2:
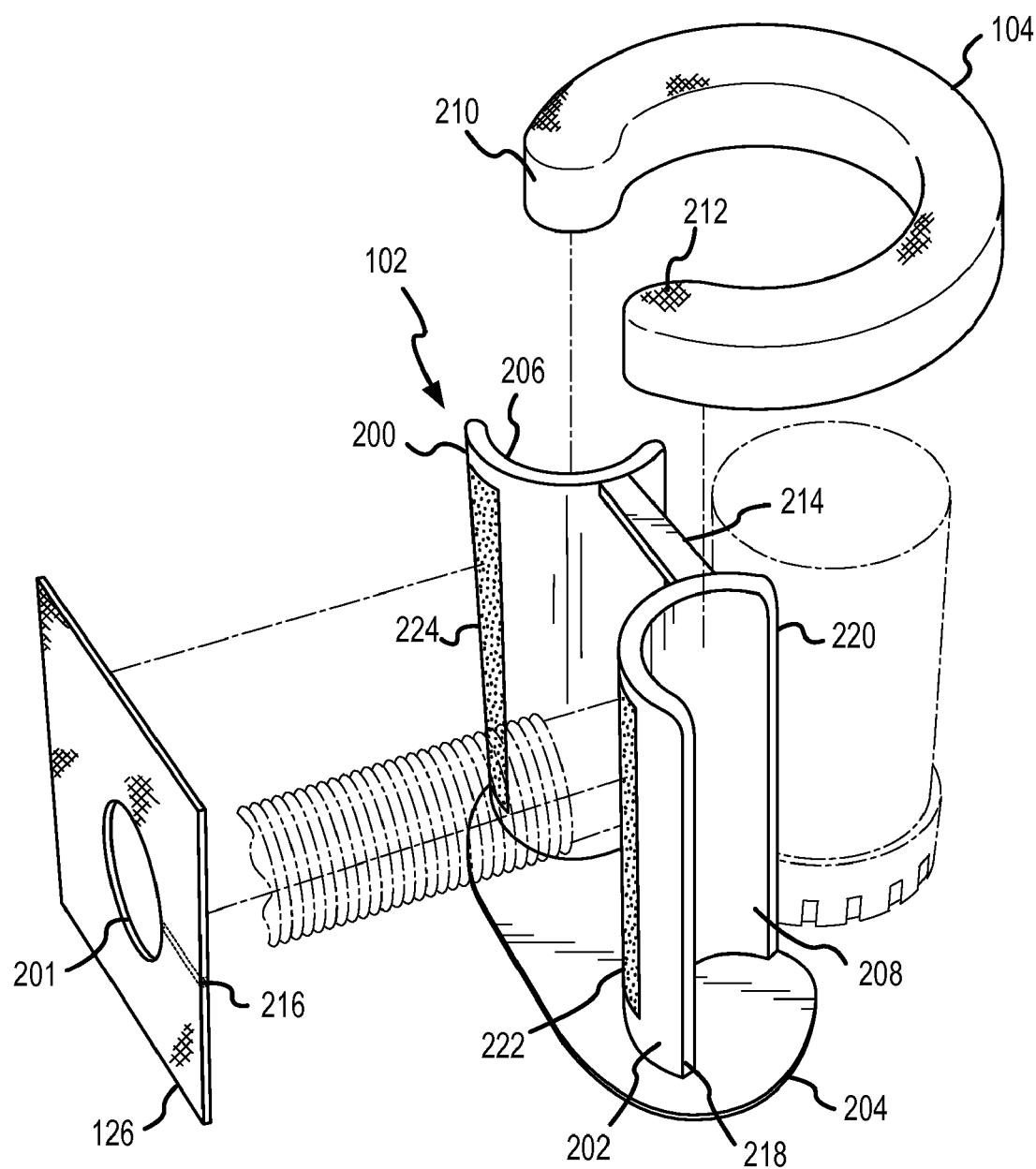
FIG. 2 illustrates an assembly view of the water pollution prevention apparatus of FIG. 1.

Referring to FIG. 2, according to one embodiment of the present water pollution prevention apparatus 100, the locator 102 includes a pair of housings, 200 and 202. The housings, 200 and 202, are connected in parallel relation to each other and perpendicular relation to a base member 204. The base member 204 is in turn, mountable within the bilge 118. The housings, 200 and 202, are generally upstanding relative to the base member 204 such that when the base member 204 is mounted in the bilge 118, the housings, 200 and 202, are in a substantially perpendicular relation to the fluid 112. This in turn controls the direction and facilitates movement of the absorber 104 as a function of the level of fluid 112 in the bilge 118. In addition, while not necessary to the present invention, a brace, such as brace 214, may also be included between the housings, 200 and 202, to provide additional stability to the locator 102.

As will be appreciated, the locator 102 including the housings, 200 and 202, and base 204, may be constructed from numerous types of materials as a matter of design choice. Preferably, however, such materials are chosen as a function of their corrosion resistance and durability in damp environments. Some examples of exemplary materials may include without limitation, plastics, fiberglass, and/or stainless steel.

The housings, 200 and 202, each include or define a locator channel, 206 and 208, respectively. The locator channels, 206 and 208, function as an interface for the slidable connection of a first end 210 and second end 212 of the absorber 104. In this regard, the housings, 200 and 202, are positioned on the base member 204 in a spaced relation such that the ends, 210 and 212, are insertable into the top of the channels, 206 and 208, to provide a slidable connection therebetween. Advantageously, such a connection provides a slidable engagement between the locator 102 and the absorber 104, as well as a detachable connection therebetween, e.g., the absorber 104 may be removed by sliding the ends, 210 and 212, out of the top of the channels, 206 and 208. This in turn facilitates simple replacement of the absorber 104 in the event it becomes worn or saturated with petrochemicals. Furthermore, as illustrated on FIG. 2, such positioning of the housings, 200 and 202, may also include a slight inward rotation of the channels, 206 and 208, relative to the absorber 104. As will be appreciated, the inward rotation minimizes the opening between the ends, 210 and 212, of the absorber 104 and maximizes the amount of absorption capability for a given absorber 104.

The absorber 104 is maintained in a substantially perpendicular orientation relative to the locator 102 through floatation on the fluid 112. In this regard, the absorber 104 is free to move with the level of fluid 112 between an upper portion 220 and lower portion 218 of the locator 102. In other words, the locator 102 operates as a vertical guide for the absorber 104, which is floated up and down within the bilge 118 as a function of the amount of fluid 112 contained therein. It will be appreciated in this regard, that the dimensions of the housings, 200 and 202, are a function of the maximum level of fluid 112 that is permitted in a given bilge, e.g., 118, as well as the size of a given bilge pump, e.g., 106. In other words, the housings, 200 and 202, should be of sufficient height to accommodate movement of the absorber 104 between a maximum fluid level and a minimum fluid level. Further, the housings, 200 and 202 should be of sufficient size to accommodate the size of a given absorber 104, which in turn is a function of bilge pump size and desired amount of absorption material. Thus, the housings, 200 and 202, may be constructed in different dimensions, as a matter of design choice, to accommodate different vessel sizes, e.g., larger vessels having the ability to accommodate more fluid 112 within their bilges and having larger pumps than smaller vessels.

The locator 102 may also include a sealing wall 126 covering the backside of the housings, 200 and 202. The sealing wall 126 includes an aperture 201 appropriately sized to accommodate the outlet conduit 116 of the bilge pump 106. In one example, the sealing wall 126 may be detachably connected to the housings, 200 and 202, to facilitate installation of the water pollution prevention apparatus 100. Those skilled in the art will appreciate numerous methods that may be utilized as a matter of design choice to provide the detachable connection of the sealing wall 126; with one example being, Velcro strips 222 and 224. The sealing wall 126 may also include a slot 216 to permit the sealing wall 126 to be snapped over the outlet conduit 116 during connection. In other words, the opposing sides of the slot 216 may be bent in opposite directions to provide a larger opening for the conduit 116 to pass through the slot 216 during connection. It should be noted that, according to this embodiment, the sealing wall 126 also operates to enclose the interior area 120 of the absorber 104 to prevent entry of petrochemicals. Thus, in this case, petrochemicals are prevented from entering the area 120, as they are unable to pass through the sealing wall 126, as well as under, or through the absorber 104.

As with the locator 102, base 204, and housings, 200 and 202, the sealing wall may be constructed from numerous types of materials as a matter of design choice. Preferably, however, such materials are chosen as a function of their corrosion resistance and durability in damp environments. Some examples of exemplary materials may include without limitation, plastics, fiberglass, and/or stainless steel.

In another example of the present water pollution prevention apparatus 100, the sealing wall may be constructed from or covered with a material that absorbs petrochemicals 300. Advantageously, this increases the absorption and removal capacity of a given apparatus 100. As discussed further below, some examples of such materials include those having a cellular material sufficiently open to allow the fluid 112 to pass freely and yet remain oil wet (oleophilic) when contacted by an oil-water mixture, e.g., petrochemicals 300.

Figure 3:
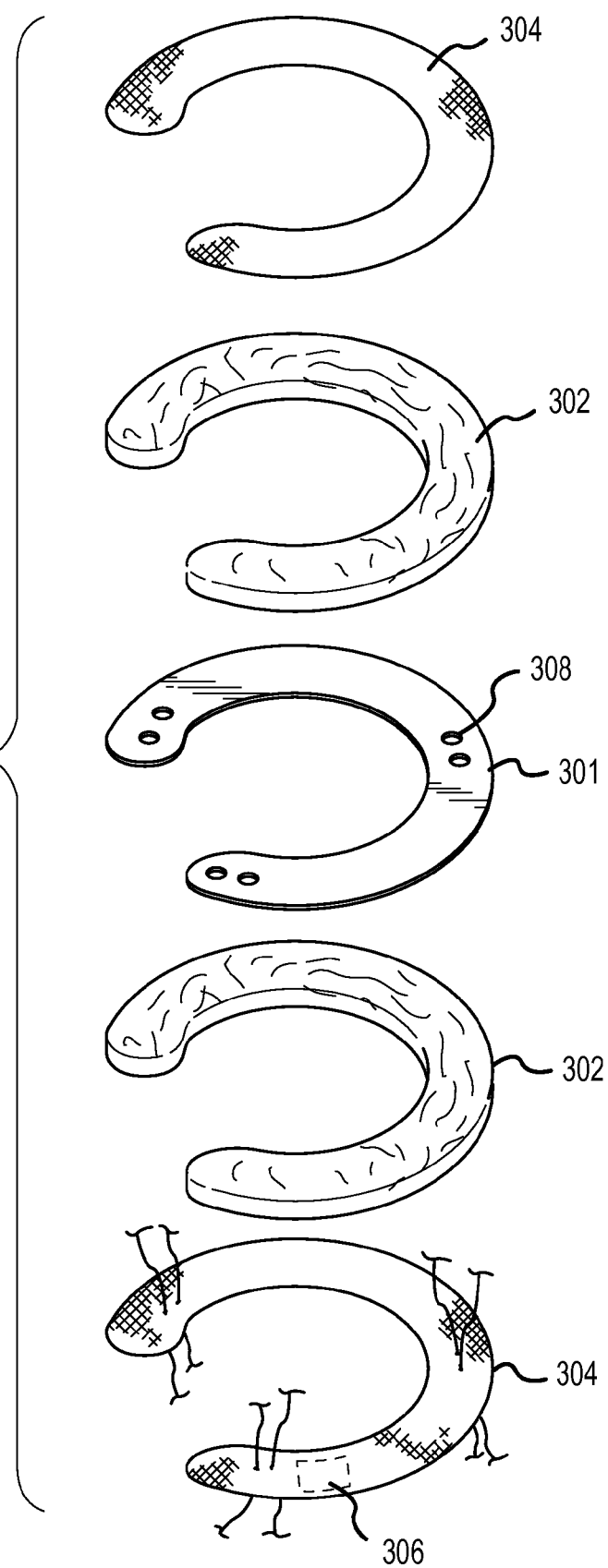
FIG. 3 illustrates an assembly view of an absorber for the water pollution prevention apparatus of FIG. 1.

FIG. 3 illustrates an assembly view of the absorber 104 according to the present invention. The absorber 104 includes a support member, e.g., a frame 301, a first material 302, and a cover material 304. The frame 301 is designed to provide support and rigidity to the absorber 104 to facilitate movement along the locator 102. Specifically, the frame 301 reduces deformation of the absorber 104 as it absorbs petrochemicals, thereby reducing binding of the ends, 210 and 212, within the locator channels, 206 and 208, respectively. This is especially advantageous as the absorber 104 becomes saturated with petrochemicals.

Taking into consideration the intended environment of use, it will be appreciated that the frame 301 may be constructed from numerous materials as a matter of design choice. Some examples of such materials include without limitation plastics and fiberglass. Furthermore, the frame 301 may be a highly porous polymer structure known as fully reticulated open-cell foam, such as polyurethane. Advantageously, such a material provides rigidity as well as providing an effective petrochemical collecting action to improve efficiency of the absorber 104. Additionally, the hydrophobic character of polyurethane foam coupled with its lightweight and relatively high specific gravity, normally in the range of 1.00 and 1.20, provides an ideal material for constructing a buoyant absorber 104 that is well adapted to serve as a floating petrochemical collection structure for the water pollution prevention apparatus 100.

While the frame 301 is shown in a semi-circular configuration on FIG. 3, it will be appreciated the frame 301 may be any geometric shape that includes an interior space, e.g., 120, sized and shaped to accommodate a bilge pump, such as pump 106. Thus, the frame 301 may be a variety of shapes including without limitation, ovular, square, rectangular, triangular, etc. each of which may be a fully enclosed or semi-enclosed structure.

The material 302 may be any material that absorbs petrochemicals 300. The material 302 may be a single piece of material or multiple pieces of material, as illustrated on FIG. 3, that are formed in the shape of the frame 301, e.g., in the illustrated embodiment, a semi-circular shape. Some examples of petrochemical absorbent materials suitable for use include those having a cellular material sufficiently open to allow the fluid 112 to pass freely and yet remain oil wet (oleophilic) when contacted by an oil-water mixture. As used herein, the term "cellular material" is intended to denote a variety of materials, including open-cell foams or sponges, and also fibrous mats, or pads, fabricated from such substances as asbestos fibers, hay, straw, cotton, synthetic fibers, such as synthetic rubber and the like. Some further examples include without limitation, generic polymers, such as polyester, polyethyl, and polyurethane foams.

In another embodiment of the absorber 104, the material 302 may be constructed from cellular materials impregnated with a hydrophobic and oleophilic sealant in a sufficient amount to coat the surfaces of the cells or capillary domains for use in absorbing oil and like pollutants. One example of such a material may be formed by impregnating a sheet of open-celled polyurethane foam with a solution of latex sealant that is inert to water but capable of being swelled in oil.

The cover material 304 may be any material suitable to maintain the petrochemical absorbing material 302 in the predetermined shape of the frame 301 and strong enough to permit physical handling even after a considerable weight of petrochemicals are absorbed. Furthermore, the cover material 304 may itself be adapted to serve as an oil collection material that operates in combination with the material 302 to absorb petrochemicals from the fluid 112. Similarly, the cover material 304 may be a petrochemical resistive material, such as polypropylene or polyethylene mesh or netting material, that permits fluid 112 and petrochemicals to pass freely through the cover material 304 into the material 302. In the first case above (where the cover material 304 is petrochemical absorbent), it may be desirable to sew the cover material 304 around the material 302 and frame 301 as the absorber 104 would be replaced upon saturation with petrochemicals 300. In this case, the frame 301 may also include apertures as exemplified by aperture 308, to facilitate attachment of the cover material 304 and/or the material 302. The apertures 308 also serve to hold the material 302 in the correct position relative to the frame 301.

In the latter case (where the cover material 304 is resistive to petrochemicals), it may be desirable to use a detachable connection such as Velcro to attach the cover material 304 around the material 302 and frame 301. This in turn facilitates replacement of the material 302 upon saturation of the same without the necessity of replacing the frame 301 and cover material 304.

In another embodiment of the absorber 104, the absorber 104 may also include an indicator 306 to provide information to a user regarding the level of saturation of the material 302, and thus, the need to replace the material 302 and/or the absorber 104 in its entirety. In one example, the indicator 306 may be an opening provided in the cover material for viewing of the enclosed material 302. In addition, the indicator opening or window may further include a transparent material sewn into the cover material 304 to protect the enclosed material 302.

Figure 4:
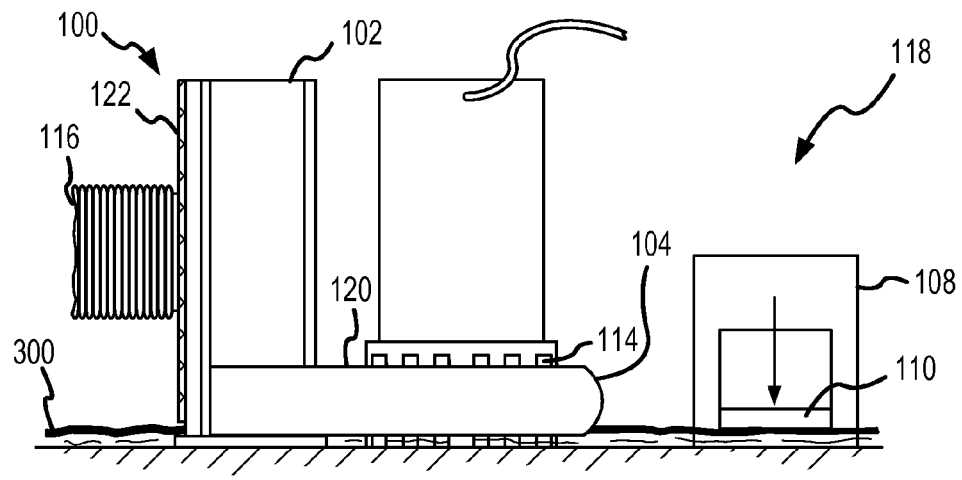
FIGS. 4-6 illustrate an operation protocol for the water pollution prevention apparatus of FIG. 1.
Figure 5:
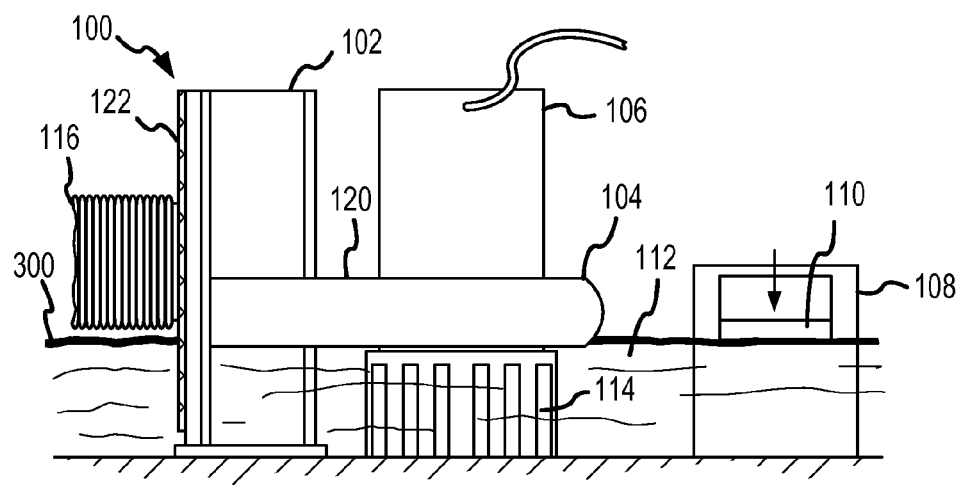
Figure 6:
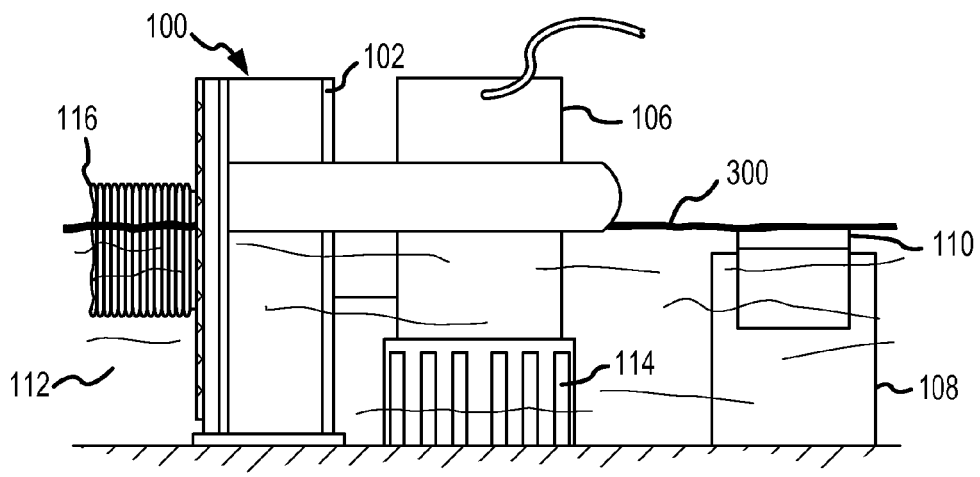

Referring to FIGS. 4-6, one example of an operational protocol for the present water pollution prevention apparatus 100 is provided. Referring first to FIG. 4, there is shown the water pollution prevention apparatus 100 installed in a bilge, such as 118, containing both fluid 112 and petrochemicals 300. The water pollution prevention apparatus 100 is installed in the bilge 118, such that the absorber 104 is positioned around the bilge pump 106. Specifically, the absorber 104 is positioned around the bilge pump 106 such that the fluid inlets 114 are contained within the interior area 120 provided by the absorber 104 and sealing wall 126 when the level of fluid 112 is below the fluid inlets 114, as illustrated on FIG. 4. This in turn isolates the fluid inlets 114 from the petrochemicals 300 minimizing the discharge of the same overboard of a vessel into a surrounding waterway(s). Referring also to FIGS. 5 and 6, during a typical cycle of the bilge pump 106, the level of the fluid 112 will begin to rise as fluid 112 collects in the bilge 118. As the level of the fluid 112 rises, the absorber 104 is floated with the rising fluid 112 upward along the locator 102. When the fluid 112 reaches a maximum fluid level, determined by the design and installation of the bilge pump 106, the float 110 trips a circuit in the float switch 108 to supply a current to the pump 106, thereby beginning operation of the same. As the pump 106 empties the fluid 112 from the bilge 118, the absorber 104 floats downward with the dropping fluid 112. It should be noted, that during operation of the pump 106 only the fluid 112 is pumped through the inlets 114 as the petrochemicals 300 remain on the surface of the fluid 112 away from the fluid inlets 114. Similarly, as the level of fluid 112 falls below the fluid inlets 114, as shown in FIG. 4, the absorber 104 circumscribes the inlets 114 substantially preventing the introduction of petrochemicals 300. In this manner, the water pollution prevention apparatus 100 operates to isolate the bilge pump 106, and particularly the fluid inlets 114, from the introduction of petrochemicals 300. It will be appreciated that FIG. 4 is provided for purpose of illustration, and that subsequent to an initial installation and operation of the pump 106, the float 110 may cease operation of the pump 106 prior to the fluid level falling below the inlets 114. This in turn, prevents cavitation of the pump 106.

Furthermore, the water pollution prevention apparatus 100 also absorbs for later removal, petrochemicals 300 from the fluid 112 and bilge 118. In this regard, as petrochemicals 300 encounter the absorber 104, such as via the fluid 112 sloshing around in the bilge 118, they are absorbed into the absorber 104 by a wicking action. In addition, as noted, the materials of the absorber 104 are preferably hydrophobic such that substantially only the petrochemicals 300 are absorbed and retained in the absorber 104.

It is anticipated that those skilled in the art will appreciate numerous other examples that are within the scope of the present invention. For instance, it will be appreciated from the above embodiment, that the double housing design of the locator 102 and semi-enclosed design of the absorber 104, accommodates bilge pumps, such as pump 106, that include an outlet conduit 116 connected out the side of the pump. Alternatively, however, a locator having a single locator housing and single locator channel may be utilized with bilge pumps having their outlet conduit out the top of the pump housing. Those skilled in the art will appreciate numerous methods of accomplishing the single locator and enclosed absorber design. For instance, the locator channel may be configured in the shape of a "T" with a mating "T" shaped connector utilized on the enclosed absorber to make the slidable connection there between. Similarly, it is possible to utilize this single locator and enclosed absorber design with the bilge pump 106, where the outlet conduit 116 is routed up and over the top of the locator. In this case, it may be desirable to make the interior space, e.g., 120, of the absorber larger so that it accommodates enclosure of the pump 106 as well as the routing of the outlet conduit 116, to prevent interference during movement of the absorber along the locator.

In another alternative embodiment and regardless of the terminology used herein, the absorber 104 may comprise a material that is impervious to petrochemicals 300, rather than a material that absorbs petrochemicals 300. In this case, the absorber 104 would not remove petrochemicals 300 from the fluid 112, but would still function to isolate the bilge pump 106 and thereby minimize the discharge of petrochemicals 300 as it would minimize entry of the same into the interior area 120.

Those skilled in the art will appreciate variations of the above-described embodiments that fall within the scope of the invention. As a result, the invention is not limited to the specific examples and illustrations discussed above, but only by the following claims and their equivalents.

The invention claimed is:

1. A method of removing petrochemicals from a fluid in a bilge of a marine vessel, the method comprising:
   positioning a locator in the bilge of the marine vessel in an upstanding relation to a fluid level;
   moving a petrochemical absorber along the locator using the fluid level, wherein the petrochemical absorber defines an interior area that is isolated from the introduction of petrochemicals; and
   absorbing petrochemicals from the fluid.

2. The method of claim 1, wherein the moving step comprises:
   maintaining a predetermined path of travel for the absorber with the locator.

3. The method of claim 1, wherein the positioning step comprises:
   positioning the locator proximate a bilge pump in the bilge.

4. The method of claim 3, wherein the positioning step comprises:
   locating the bilge pump in the interior area of the absorber.

5. The method of claim 3, wherein the positioning step comprises:
   responsive to the bilge pump pumping the fluid from the bilge, locating an inlet of the bilge pump in the interior area of the absorber using the locator.

6. The method of claim 1, the method further comprising:
   laterally restraining the absorber during the moving step.

7. The method of claim 1, wherein the moving step comprises:
   supporting the absorber on a surface of the fluid as a level of the fluid changes.

8. The method of claim 1, wherein the moving step comprises:
   sliding the absorber between upper arid lower positions on the locator.

9. The method of claim 1, wherein the absorbing step comprises:
   contacting petrochemicals with the absorber; and
   absorbing the petrochemicats as the absorber floats on a surface of the fluid and is moved along the locator with changing fluid levels.

10. A method of removing petrochemicals from a fluid in a bilge of a marine vessel, the method comprising:
    locating an absorber in a predetermined lateral position within the bilge, wherein the absorber defines an interior area and wherein the absorber isolates the interior area from the introduction of petrochemicals;
    moving the absorber up and down within the bilge as a function of a fluid level in the bilge
    maintaining the lateral position of the absorber as the absorber moves up and down with the fluid level; and
    absorbing petrochemicals from the fluid.

11. The method of claim 10, wherein the locating step comprises:
    positioning a locator in the bilge of the marine vessel in an upstanding relation to the fluid level; and
    disposing the absorber about at least a portion of the locator.

12. The method of claim 11, wherein the moving step comprises:
    moving the absorber along the locator, wherein the locator defines a predetermined path of travel for the absorber.

13. The method of claim 11, wherein the moving step comprises:
    moving the absorber between upper and lower portions of the locator.

14. The method of claim 11 wherein the locating step comprises:
    positioning the locator proximate to a bilge pump.

15. The method of claim 14, wherein the maintaining step comprises:
    maintaining the lateral position of the absorber to position the bilge pump in the interior area of the absorber.

16. The method of claim 14, wherein the positioning step comprises:
    maintaining the lateral position of the absorber to position an inlet of the bilge pump in the interior area of the absorber.

17. A method of removing petrochemicals from a fluid in a bilge of a marine vessel, the method comprising:
    defining an isolated surface area on the fluid surface within a bilge using a petrochemical absorber, wherein the petrochemical absorber floats on the fluid surface while slidably engaged with a rigid locator that is an upstanding relationship to the fluid surface;
    drawing fluid from a location within a fluid volume defined by the isolated surface area and extending vertically between the fluid surface and a bottom surface of the bilge; and
    removing the fluid from the bilge.

18. The method of claim 17, wherein drawing further comprises:
    maintaining a fluid inlet associated with a bilge pump within the isolated volume.

* * * * *

UNITED STATES PATENT AND TRADEMARK OFFICE
CERTIFICATE OF CORRECTION

PATENT NO. : 7,354,518 B2
APPLICATION NO. : 11/549907
DATED : April 8, 2008
INVENTOR(S) : Clukies It is certified that error appears in the above-identified patent and that said Letters Patent is hereby corrected as shown below:

Column 11, line 41, delete "petrochemicats" and insert therefor --petrochemicals--.

Signed and Sealed this

First Day of July, 2008

JON W. DUDAS
*Director of the United States Patent and Trademark Office*